United States Patent [19]

Gaskell

[11] 3,912,925

[45] Oct. 14, 1975

[54] METHOD AND APPARATUS FOR MACHINING WORKPIECES

[75] Inventor: Jesse Gaskell, Modesto, Calif.

[73] Assignee: J & M Associates, Inc., Modesto, Calif.

[22] Filed: Jan. 2, 1974

[21] Appl. No.: 430,346

[52] U.S. Cl. .................... 250/227; 250/221; 408/6

[51] Int. Cl. .................... H01j 5/16

[58] Field of Search .................... 250/227, 221, 222; 350/96 B; 408/6, 16

[56] References Cited

UNITED STATES PATENTS

| | | | |
|---|---|---|---|
| 2,256,595 | 9/1941 | Metcalf | 250/227 |
| 2,677,168 | 5/1954 | Dewan | 408/6 |
| 3,255,357 | 6/1966 | Kapany | 250/227 |
| 3,335,287 | 8/1967 | Hargens | 250/227 |
| 3,480,786 | 11/1969 | Kottman | 250/227 |
| 3,575,129 | 4/1971 | Sullivan | 350/96 B |
| 3,729,047 | 4/1973 | Bohnlein | 250/227 |
| 3,746,575 | 7/1973 | Arnaudin | 250/227 |

*Primary Examiner*—James W. Lawrence
*Assistant Examiner*—D. C. Nelms
*Attorney, Agent, or Firm*—Seidel, Gonda & Goldhammer

[57] ABSTRACT

Light radiation is generated and conducted by an optical fiber so that it is incident on a machining tool. The dimensional distortion of the tool, including cracking and fracturing, results in the reception of the generated light by another optical fiber. The received light is detected by a transducer and, in response, the position of the machining tool is arrested and a warning signal is generated.

30 Claims, 3 Drawing Figures

METHOD AND APPARATUS FOR MACHINING WORKPIECES

BACKGROUND OF THE INVENTION

The present invention relates to apparatus for monitoring a tool which repetitively machines workpieces. In particular, the present invention relates to automatically positioned circuit board drills and, further, to a drill having a light responsive detection system for detecting the dimensional distortion, including fracturing, of a drill bit.

Conventional automatically positioned circuit board drills are controlled by means of a punched tape which commands coordinate position motors according to a preselected program. A drill table carries one or more stacks of circuit board cards which are laid out according to a fixed coordinate system. The motors automatically position the drill table, with the cards thereon, relative to the drill bit according to the coordinate system. At the programmed coordinates, the drill is lowered and a hole is drilled through each circuit board in the stack. Typically, the drilling operation proceeds at high speed, for example, at the rate of one hole per second. It is not uncommon that each circuit board requires more than 10,000 holes. In addition, it may be necessary to position each hole within one ten-thousandths of an inch of a particular coordinate position.

In order to attain this accuracy, the drill bits must be substantially rigid and, as a result, the bits are easily broken. This is particularly troublesome since the circuit boards are usually drilled in stacks of four or more. Thus, if a bit becomes distorted or fractured during the drilling operation and the event is not immediately detected the precise coordinates at which the distortion or fracture occurred will not be known. Consequently, the location of the first defective hole will not be known and the boards will have to be re-drilled from the beginning. This entails needless expenditures in time and energy in operating the drill at those coordinates for which holes had already been properly drilled. Moreover, the event may even go unnoticed until succeeding stacks of borads have already been aligned and the corresponding drilling programs executed with the defective bit.

A principal advantage of the present invention is that it automatically arrests the drill as soon as a bit becomes distorted or fractured.

A further advantage of the present invention is that it provides the exact coordinate position at which the bit became defective.

Another advantage of the present invention is that it permits the machine operator to replace the defective bit without delay so that the drilling may be resumed without any loss of registration with the drilling program.

A still further advantage of the present invention is that it is operable over a wide range of light frequencies and, in particular, at other than visible light frequencies.

BRIEF SUMMARY OF THE INVENTION

The present invention overcomes the deficiencies in the prior art which are enumerated above. In sharp contrast to the prior art, the present invention includes an optical fiber for conducting generated light radiation so that it is incident on a machining tool when the tool is operating properly in place. Another optical fiber is aligned to receive the conducted light radiation. However, the machining tool occludes the conducted light from entering the second optical fiber unless the tool becomes distorted, say by bending, cracking or fracturing, in which case the light enters the second optical fiber. The light entering the second optical fiber is conducted to a light detector or transducer which triggers a warning device and a device for arresting the position of the tool. The tool, then, temporarily ceases to operate and the machining program is halted at the coordinate position at which the tool became defective.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
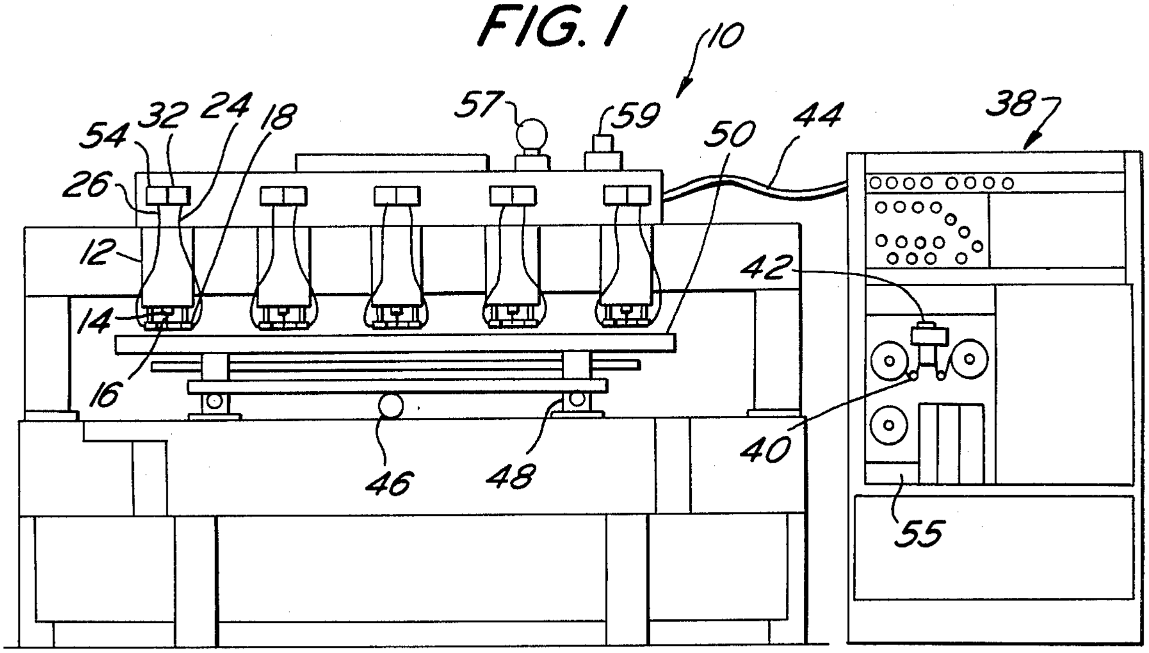
FIG. 1 is a side elevational view of a light responsive drill constructed in accordance with the principles of the present invention.

Referring to the drawings in detail, wherein like numerals indicate like elements, there is shown in FIG. 1 an automatically positioned circuit board drill 10 including a plurality of drill motors 12. The motor 12 has a shaft (not shown) which is coupled to a collet or chuck 14. The collet 14 is adapted to house a drill bit 16. It should be understood that, although the specific embodiment herein relates to a circuit board drill provided with a drill bit, the scope of the present invention relates to apparatus for monitoring other machining tools as well. That is, the present invention includes machining tools such as needles or punches which may repetitively machine workpieces other than circuit boards. The nature of the particular workpieces being machined, then, is not a limitation of the present invention.

Figures 2, 3:
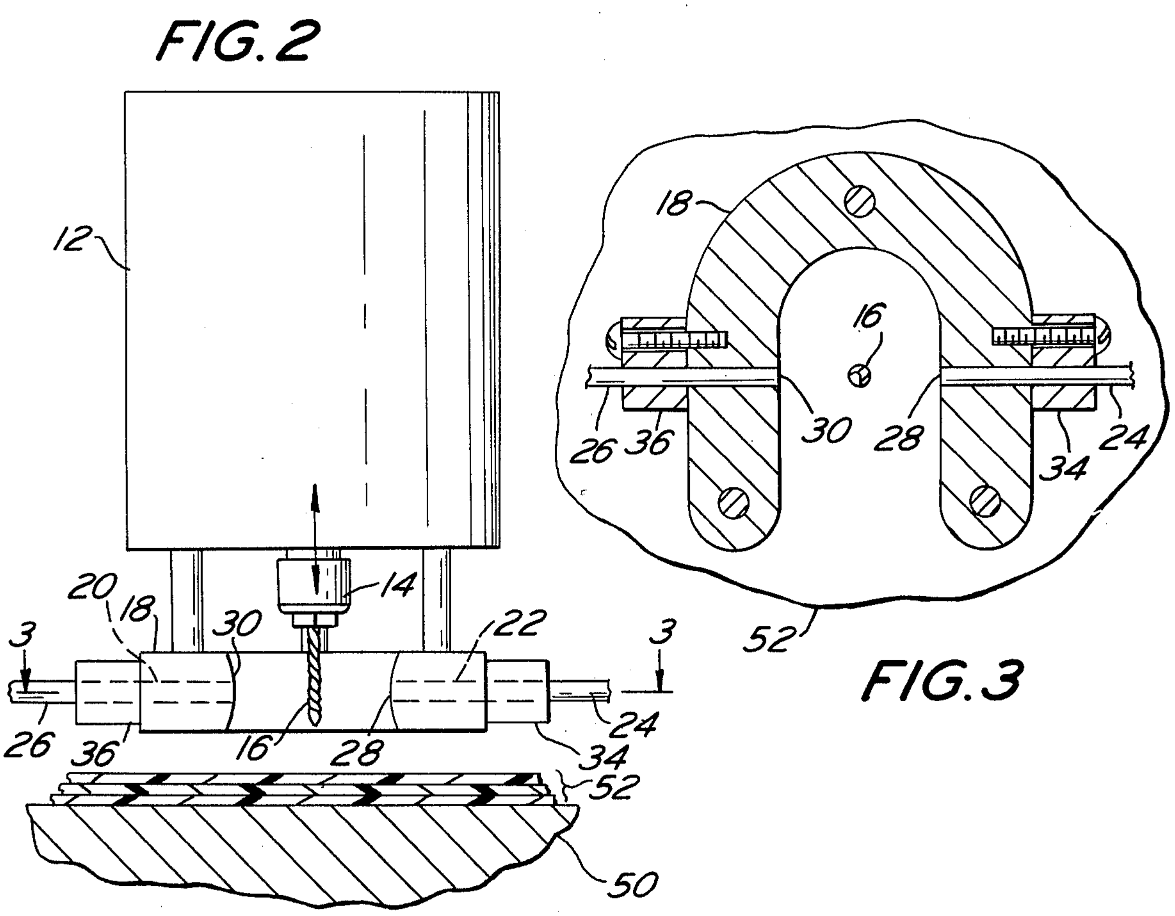
FIG. 2 is an enlarged view of a portion of the apparatus shown in FIG. 1.
FIG. 3 is a plan view of a portion of the drill taken along line 3 in FIG. 2.

As shown, the drill bit 16 is centered within a U-shaped wall or drill foot 18. Preferably, the drill foot 18 is made of a polymeric plastic material. This permits the foot 18 to contact the workpiece, here circuit boards 52, without marring. Conventionally, the drill foot 18 merely serves to contact the boards 52 and, thereby, hold the boards 52 in fixed position for drilling. In the present invention, however, the foot 18 also serves to support light conductors 24 and 26. Specifically, the drill foot 18 is provided with passages 20 and 22, as shown in FIG. 2, for supporting the light conductors 24 and 26. Thus, the passage 22 supports a transmitting light conductor 24 and the passage 20 supports a receiving light conductor 26. The transmitting light conductor 24 is coupled to a light source 32. Passages 20 and 22 may be holes bored through the drill foot 18 as shown or they may be channels (not shown) formed in the foot 18 which support the light conductors 24 and 26. In addition, light conductors 24 and 26 may be securely mounted on the top of foot 18 by any conventional fastening means, so long as they are aligned as described below. In the preferred embodiment shown, the passages 20 and 22 are aligned so that conductor 24 is substantially directed to port 30 of conductor 26.

Transmitting light conductor 26 is coupled to light transducer 54. If the path between ports 28 and 30 was unobstructed, the transducer 54 would detect the light received at port 30. However, the drill bit 16 is centered within the interior or mouth of drill foot 18 such that the light emitted from port 28 normally is occluded from entering port 30. It is particularly significant that the sensitivity of the present invention is so precise that a machining tool such as the drill bit 16, 0.013 inches in diameter will occlude the transmission of light between ports 28 and 30. Further, although passages 20 and 22 are shown equidistant from the top and bottom surfaces of foot 18, by locating passages 20 and 22 nearer to the bottom surface of foot 18 the light radiation can be directed to the tip of bit 16, where most brakes occur. In addition, the effectiveness of the present invention is not limited by the proximity of the machining tool to the workpiece. That is, the working condition of the bit 16 is monitored even when the bit tip is extremely close to the workpiece. Furthermore, the bit 16 can be monitored while it is idle as well as while it is operating.

In the preferred embodiment shown in FIG. 1, each drill motor 12 is provided with its own light source 32 although it should be obvious that a single light source 32 may be employed to generate the light radiation entering each transmitting light conductor 24 without exceeding the scope of the invention. In other words, the plurality of transmitting light conductors 24 may be excited in parallel by a single light source 32.

The light source 32 may, in particular, be an incandescent bulb having a tungsten filament. However, other sources of light radiation are also suitable in the present invention; for example, lasers or infrared radiation sources may also be used as the sources of light.

It is preferred that the transmitting and receiving light conductors 24 and 26 be optical fibers. As used herein, the term "optical fibers," refers to fibers which guide light, either in the ultraviolet, visible, or infrared regions of the light spectrum, through predetermined paths. For the purpose of transporting light along flexible paths to permit the illumination of otherwise inaccessible regions, the optical fibers are ideal. Furthermore, optical fibers are relatively light and, as a result, they can be assenbled in the drill foot 18 so that they will not interfere with the drilling process. In addition, for the purpose of efficiently transporting the light, focusing lenses (not shown) may be inserted in the appropriate places according to principles well-known to a person of ordinary skill in the art.

As shown in FIG. 3, the optical fibers, represented therein by light conductors 24 and 26, are housed within coupling blocks 34 and 36, respectively. Coupling block 34 is aligned with drill foot 18 so that passage 22 accepts the transmitting light conductor 24. Similarly, coupling block 36 is aligned with drill foot 18 so that passage 20 accepts receiving light conductor 26. As already explained, the passages 20 and 22 are so arranged relative to the position of the drill bit 16 that the light radiation emerging from port 28 is occluded, by bit 16, from entering port 30 located on the opposite side of the mouth of the drill foot 18.

With the foregoing in mind, the operation of the present invention may presently be set forth. An automatically positioned circuit board drill 10 is controlled by position controller 38 which is commanded by punched tape 40. The punched tape 40 carries the programmed information which determines the nature and sequence of the steps in a drilling operation. The particular drilling operation, of course, will depend upon the number and type of circuit boards which must be drilled. The position controller 38 includes a tape reader 42 which reads the information stored in the tape 40, namely, the coordinate position of the drill relative to a circuit board as well as the on/off state of the drill. Position controller 38 converts the information stored on punched tape 40 into corresponding electrical signals which are carried by electrical cable 44 to Y coordinate encoder motor 46, X coordinate encoder motor 48, and drill motor 12. Thus, drilling table 50 is displaced in the X–Y coordinate plane according to the commands stored on punched tape 40. Moreover, the drill bit 16 is lowered or raised according to the command on punched tape 40. The vertical action of the collet 14 and drill bit 16 is represented by the double ended arrow in FIG. 2. The collet 14 and drill bit 16 are shown in the raised position in FIG. 2, but they are lowered to drill through the stack of circuit boards 52 resting on table 50.

If the dimensions of the drill bit 16 become distorted, or if the bit 16 fractures, the light emerging from port 28 will strike the opposite port 30 and enter light conductor 26. The light conductor 26 guides the light to transducer 54 which converts the guided light into an electrical warning signal. The electrical warning signal controls a relay 55 which then halts the drilling operation by cutting off the power which drives the controller 38. For example, the relay 55 may be interposed between the power source and the controller 38 for this purpose. Although it is preferred that the transducer 54 be a cadmium sulfide photocell, many other light sensitive transistor devices are also suitable for use in the present invention without departing from the spirit or scope thereof. Similarly, although the position controller 38 may be halted by relay 55 therein, other electrical means for halting the controller by switching between two electrical states, viz, conducting or nonconducting, also are contemplated to be within the scope of the invention.

Furthermore, the electrical warning signal generated by transducer 54 may also operate any of a multitude of conventional acoustic or visible warning devices, e.g., the warning signal may trigger a siren 59 or a flashing light 57.

It is of special importance that the present invention provides an automatically positioned circuit board drill which monitors its own operation and which detects a defect in the drill bit before the defective bit can damage the undrilled portions of a board or stack of boards. As described in the foregoing, the drilling operation, which otherwise would proceed according to the predetermined program, will be halted if the drill bit 16 wobbles due to, say, improper insertion into the collet 14; if the dimensions of the bit 16 become distorted by bending; or if the bit 16 fractures. In short, anything which causes the bit 16 to deviate from its prescribed location also will cause the light emerging from port 28 of light conductor 24 to enter port 30 of light conductor 26. This light, in turn, triggers transducer 54 to issue an electrical warning signal which arrests the operation of position controller 38 and, correspondingly, the operation of drill motor 12 and coordinate position motors 46 and 48.

Although reference has been made herein to the operation of position controller 38 in the course of disclosing the features of the present invention, it should be noted that controller 38 is well-known in the art and, for example, may be the Series 6000 Numerical Controller sold by Digital Systems, Inc.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising
a machining tool;
means for generating light radiation at a location remote from said tool;
means for transducing said light radiation at a location remote from said tool;
optical fiber transmitting means for conducting said light radiation;
optical fiber receiving means for conducting said light radiation;
said transmitting means being coupled to said light generating means at one end and being open at its other end;
said receiving means being coupled to said transducing means at one end and being open at its other end;
said receiving means open end and said transmitting means open end being adjacent said tool and disposed relative to each other so that the light radiation conducted by said transmitting means emerges from its open end and is substantially directed to the open end of said receiving means;
a common support having aligned passages for supporting said open ends and having an open interior; and
said machining tool being disposed in said open interior between said passages for said transmitting and receiving means so that light radiation emerging from the open end of said transmitting means is substantially incident on said machining tool and occluded from entering the open end of said receiving means.

2. Apparatus according to claim 1 wherein said machining tool is a drill bit.

3. Apparatus according to claim 1 wherein said light generating means is an incandescent bulb.

4. Apparatus in accordance with claim 1 wherein said common support is a planar polymeric plastic member having generally parallel legs, each leg having one of said passages supporting one of said open ends.

5. Apparatus according to claim 1 wherein said transducing means is a photocell.

6. Apparatus according to claim 1 including arresting means for arresting the position of said machining tool in response to said transducing means.

7. Apparatus according to claim 6 wherein said arresting means is a relay connected to said transducing means.

8. Apparatus according to claim 1 including means for producing an acoustic signal in response to said transducing means.

9. Apparatus according to claim 8 wherein said acoustic signal means is a siren.

10. Apparatus according to claim 1 including means for producing a visible signal in response to said transducing means.

11. Apparatus according to claim 10 wherein said visible signal means is a bulb.

12. Apparatus comprising
a machining tool;
means for generating light radiation;
means for transducing said light radiation;
transmitting means for conducting said light radiation;
receiving means for conducting said light radiation;
u-shaped work engaging means for supporting each of said transmitting and receiving means;
said supporting means having an open interior;
said machining tool being adapted for reciprocating displacement within said supporting means open interior;
said transmitting means being coupled to said light generating means at one end and being open at its other end;
said receiving means being coupled to said transducing means at one end and being open at its other end;
said receiving means open end and said transmitting means open and being disposed relative to each other so that the light radiation conducted by said transmitting means emerges from its open end and is substantially directed to the open end of said receiving means; and
said machining tool being disposed relative to said transmitting and receiving means so that light radiation emerging from the open end of said transmitting means is substantially incident on said machining tool and occluded from entering the open end of said receiving means.

13. Apparatus according to claim 12 wherein said machining tool is a drill bit.

14. Apparatus according to claim 12 wherein said light generating means is an incandescent bulb.

15. Apparatus according to claim 12 wherein said transmitting and receiving means are optical fibers.

16. Apparatus according to claim 12 wherein said transducing means is a photocell.

17. Apparatus according to claim 12 including arresting means for arresting the position of said machining tool in response to said transducing means.

18. Apparatus according to claim 12 wherein said arresting means is a relay connected to said transducing means.

19. Apparatus according to claim 12 including means for producing an acoustic signal in response to said transducing means.

20. Apparatus according to claim 12 wherein said acoustic signal means is a siren.

21. Apparatus according to claim 12 including means for producing a visible signal in response to said transducing means.

22. Apparatus according to claim 12 wherein said visible signal means is a bulb.

23. Apparatus according to claim 12 wherein said supporting means includes a wall, the interior of said wall being a continuous extension of the exterior of said wall, said wall being provided with a first passage for supporting said transmitting means in secure engagement and a second passage for supporting said receiving means in secure engagement, said first and second passages being disposed substantially opposite each other and beginning along the exterior of said wall and terminating along the interior of said wall.

24. Apparatus according to claim 13 wherein said wall is arcuate.

25. Apparatus according to claim 13 wherein said wall is a polymeric plastic material.

26. A method comprising the steps of generating light radiation;

transmitting said light radiation through a first optical fiber to a location adjacent a machining tool;

positioning the end of a second optical fiber opposite the end of said first optical fiber;

positioning a movable machining tool intermediate said oppositely disposed ends of said first and second optical fibers so that the transmitted light radiation is incident on said machining tool and is occluded from entering the second optical fiber;

supporting said fiber optic ends on a common support member engaging the work acted on by said tool and without marring the work by such engagement;

causing relative movement between said tool and work;

detecting light radiation in said second optical fiber received from the first optical fiber when the machining tool malfunctions; and arresting the machining tool in response to said detected light radiation.

27. The method according to claim 26 wherein said detecting step includes transducing the light radiation received by said second optical fiber into an electrical signal.

28. The method according to claim 27 including the step of generating an acoustic warning signal in response to said electrical signal.

29. The method according to claim 27 including the step of generating a visible warning signal in response to said electrical signal.

30. A method in accordance with claim 27 including using a single light source for simultaneously monitoring a plurality of said tools with each tool having a set of said first and second fibers associated therewith.

* * * * *